United States Patent [19]
Sinner et al.

[11] Patent Number: 5,711,567
[45] Date of Patent: Jan. 27, 1998

[54] ARRANGEMENT FOR CONNECTING THE DASHBOARD AND THE CENTER CONSOLE

[75] Inventors: Michael Sinner, Rottenburg; Ulrich Nienhaus, Nagold; Heinz Koukal; Juegen Koerber, both of Sindelfingen, all of Germany

[73] Assignee: Mercedes-Benz AG, Stuttgart, Germany

[21] Appl. No.: 669,607

[22] Filed: Jun. 24, 1996

[51] Int. Cl.⁶ ........................................ B60R 7/00
[52] U.S. Cl. .................. 296/37.8; 296/70; 296/29
[58] Field of Search .................... 296/37.8, 37.12, 296/29, 194, 37.14, 70; 180/90; 224/483, 539, 543, 545, 547, 555, 557

[56] References Cited

U.S. PATENT DOCUMENTS

| | | | |
|---|---|---|---|
| 4,087,126 | 5/1978 | Wynn | 296/37.8 |
| 4,690,448 | 9/1987 | Fujisawa | 296/37.8 |
| 4,691,960 | 9/1987 | Miyadera | 296/37.8 |

FOREIGN PATENT DOCUMENTS

| | | |
|---|---|---|
| 0 047 858 A1 | 3/1982 | European Pat. Off. . |
| 406219213 | 8/1994 | Japan ........................... 296/37.8 |

*Primary Examiner*—Joseph D. Pape
*Attorney, Agent, or Firm*—Evenson, McKeown, Edwards & Lenahan, P.L.L.C.

[57] ABSTRACT

An arrangement connecting the dashboard and the center console. On both sides of the rearward face end of the dashboard, dovetail guides are provided which are formed by the detachable mounting of at least one dovetail connection element, are accessible from above and extend essentially in a downward widening manner. On the forward face end of the center console, dovetail guides are provided which are molded on both sides, are closed in the upward direction, extend in the downward direction in a widening manner and interact in a form-locking fashion with the respective assigned dovetail guide on the dashboard. As a result, an easily mountable, reliable connection of the center console and the dashboard is implemented at low expenditures.

6 Claims, 2 Drawing Sheets

ARRANGEMENT FOR CONNECTING THE DASHBOARD AND THE CENTER CONSOLE

BACKGROUND AND SUMMARY OF THE INVENTION

This invention relates to a an arrangement detachably connecting a center console to a dashboard of a motor vehicle. A connecting arrangement of this type permits a form-locking and force-locking as well as smoothly extending transitions between the center console and the dashboard at low expenditures and in a simple mounting.

It is known to screw the center console by means of visible screwed connections directly to the dashboard. However, this mounting technique permits only a limited shaping for the two parts in the connection area and may interfere with the visibility or accessibility of the screws. Furthermore, it is known to fix the center console on the dashboard by a hooking-in and a securing by means of screws, in which case a holding arrangement for force transmission and as a reference point for installation tolerances is required on the transmission tunnel. Furthermore, a bayonet catch system is known from the applicant's vehicle as the connection between the dashboard and the center console, in which fastening angles are screwed onto the dashboard as well as onto the center console. By means of their interaction, the bayonet catch is provided which takes over the transmission of force and moments between the two components.

An object of the present invention is to provide an arrangement connecting the dashboard and the center console which can be produced in a constructively simple manner, permits a simple mounting operation and results in a smoothly extending form-locking and force-locking, low-tolerance connection between the center console and the dashboard.

These and other objects have been achieved by providing an arrangement for connecting a dashboard and a center console comprising at least one connection element which is detachably mounted on a rearwardly facing end of the dashboard said connection element having dovetail guides which extend in a downwardly widening manner; and having form-lockingly acting connection devices, wherein the connection devices comprise dovetail guides which are formed on both sides on the rearward face end of the dashboard by the detachable mounting of at least one dovetail connection element are accessible from above and extends in an essentially downwardly widening manner, and dovetail guides which are molded on both sides to the forward face end of the center console and which are closed in the upward direction and are constructed to be downwardly widening and which interact in a form-locking manner with the respective assigned dovetail guide on the dashboard.

The two lateral dovetail joints result in a form-locking and force-locking fixing of the center console on the dashboard. By detaching the connection element or elements after taking off the center console, the dashboard can be demounted for repair at low expenditures. Since one group of the two dovetail connections are molded directly onto the forward face end of the center console, the connecting arrangement requires only that the connection element or elements be separate connection components. The design of the dovetail guides is selected such that, after the connection element or elements are mounted on the dashboard in the vehicle, the center console can be slid from above in a form-locking and force-locking manner without any other preliminary work directly onto the connection elements.

In a further advantageous development of the invention, two separate connection elements are provided for making available the dashboard-side dovetail guides which are formed in a simple manner as shaped plastic parts.

As an alternative, in a further advantageous development of the invention, an individual dovetail connection element is provided in the form of a cross-traverse to which the two required dovetail guides are molded onto the end side. In addition, the cross-traverse can take over the function of a dome flank stiffening element for the dashboard.

In a further advantageous development of the invention, the cross-traverse can be premounted simultaneously with the fastening of a center reinforcing part on the dashboard, in which case such a center reinforcing part is conventionally provided for receiving mounting parts, such as the car radio, the ashtray, etc.

A further advantageous development of the invention provides a securing screwed connection which additionally connects the center console in a securing manner with the cross-traverse and the center reinforcing part so that, for example, an additional force transmission in the longitudinal direction of the vehicle is permitted.

These and other objects, features and advantages of the present invention will become more readily apparent from the following detailed description when taken in conjunction with the accompanying drawings.

DETAILED DESCRIPTION OF THE DRAWINGS

Figure 1:
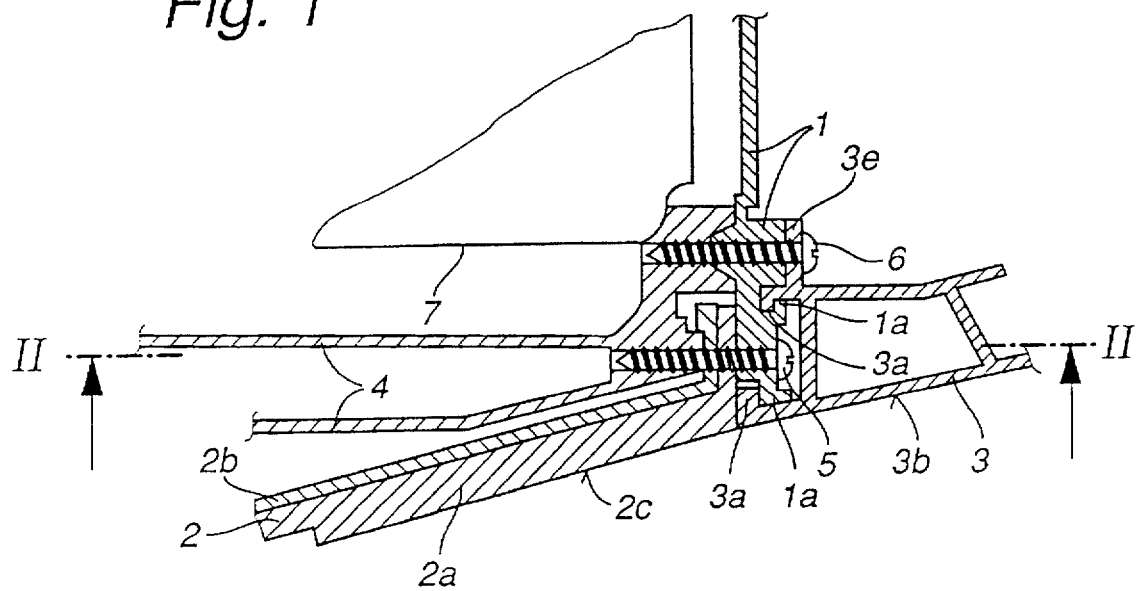
FIG. 1 is a top view of a horizontal section through one half of a an arrangement connecting the dashboard and the center console according to a preferred embodiment of the present invention.
Figure 2:
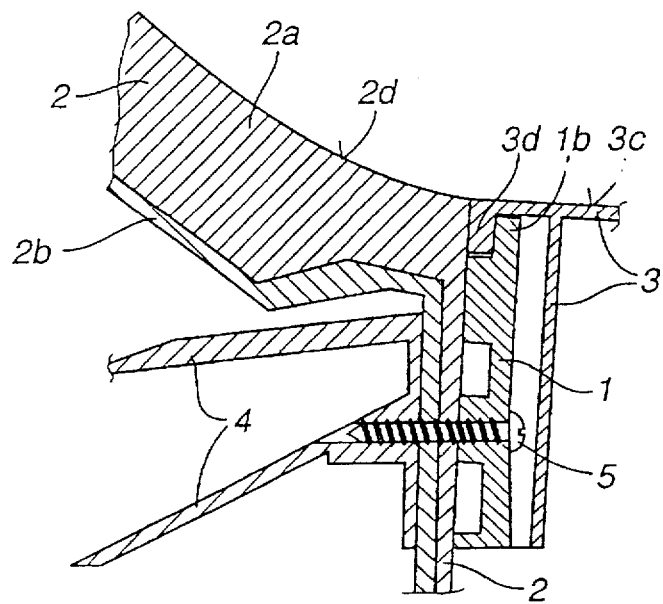
FIG. 2 is a lateral sectional view along Line II—II of FIG. 1.

FIGS. 1 and 2 show a cutout of a connecting arrangement which contains a cross-traverse 1 and connects a rearwardly facing end of a dashboard 2 including a center reinforcing part 4 premounted therein with the forwardly facing end of a center console 3. The illustrated cutout comprises a lateral end area of the connecting arrangement. On the opposite end of the cross-traverse 1 extending horizontally in the transverse direction of the vehicle, the connecting arrangement has a mirror-symmetrical construction with respect to the longitudinal center plane of the vehicle so that, in the following, the explanation will be limited to the illustrated half of the connecting arrangement.

As illustrated in FIGS. 1 and 2, the cross-traverse 1 is fastened on its end area by a screwed connection 5 on the dashboard 2 which is composed of a shaped plastic part 2b and an exterior covering 2a. Simultaneously, by way of this screwed connection 5, the center reinforcing part 4 is fixed in this area on the dashboard 2. The cross-traverse 1 carries out the function of a transverse stiffening of the dashboard dome flanks and, together with the center reinforcing part 4, forms a closed frame for mounted parts 7, such as an ashtray, a cassette compartment, a radio, etc. Therefore, during the mounting of the center reinforcing part 4 on the dashboard 2, by way of the screwed connection 5, the cross-traverse 1 is premounted at the same time.

As illustrated in FIG. 1, on the cross-traverse 1 in its end area on the side facing away from the dashboard 2, a dovetail guide is molded on which is formed of two webs 1a which extend essentially in the vertical direction of the vehicle. The two webs 1a extend at least partially in opposing lateral directions to form respective forwardly facing surfaces which can be engaged by respective mating surfaces extending laterally around the two webs 1a from behind. The spacing between the two webs 1a increases in the downward direction. A corresponding dovetail guide, which is molded onto the respective forwardly facing end flank of the center console 3 interacts with this dovetail guide 1a of the cross-traverse 1. The corresponding dovetail guide consists of two forwardly-extending webs 3a which are bent in a mutually facing manner, extending essentially in the vertical direction of the vehicle and reaching laterally around the webs 1a of the cross-traverse 1 to engage the forwardly facing surfaces of the webs 1a. In this manner, a form-locking and force-locking a dovetail connection is achieved. In this case, the dovetail webs 3a on the center console flank are correspondingly constructed with a spacing which decreases in the upward direction so that, during mounting, the center console 3 can be fitted by way of its two lateral dovetail guides 3a from above onto the premounted cross-traverse 1 and can be connected with the dashboard 2 in this manner. As illustrated, after the center console 3 is mounted this center console 3 will cover the fastening screws 5 of the cross-traverse 1.

The dovetail guides 3a molded onto the center console 3 are constructed to be closed in the upward direction so that, when the center console 3 is mounted, a smooth transition is achieved between the center console top side 3c and the dashboard top side 2d, as illustrated in FIG. 2. FIG. 2 also shows that the plug-type dovetail connection of the center console 3 and the cross-traverse 1 or the dashboard 2 offers additional support from a flange 1b molded on the top side of the cross-traverse 1. The flange 1b connects the two dovetail webs 1a on the top side and is engaged from behind in a form-locking and force-locking manner by a flange 3d which analogously connects the two dovetail webs 3a of the center console 3 on top in a curved manner. The flange 3d extends downwardly from the center console top side 3c to engage a forwardly facing surface of the flange 1b. FIG. 1 illustrates that a smooth transition is also achieved on the lateral side between the lateral dashboard surface 2c and the lateral center console surface 3b.

For additional connection strength, a securing screwed connection 6 extending in the longitudinal direction of the vehicle is assigned to each dovetail connection as shown in FIG. 1. This securing screwed connection 6 is entered after the center console 3 has been fitted on and additionally connects the center console 3 in a securing manner with the cross-traverse 1 and the center reinforcing part 4. For this purpose, an inwardly pointing fastening flange 3e is molded to each center console flank and is easily accessible from above through a gear shift block cutout of the center console 3 so that this screwed connection 6 can be made and released at low expenditures. Therefore, for disassembly, this securing screwed connection 6 is released first, after which the center console 3 can be taken off in the upward direction. Subsequently, as required, the cross-traverse fastening screw 5 can be released, after which the cross-traverse 1 and the center reinforcing part 4 are detached in this area from the dashboard 2. As required, the dashboard 2 can then be removed completely for the purpose of exchange or repair.

FIGS. 3 to 6 show a second connecting arrangement according to the invention in which, instead of the above-described cross-traverse, two individual dovetail connection elements 11 are provided which are detachably mounted on the respective sides of the rearwardly facing end of a dashboard 12 by way of screwed connections 15. FIGS. 3 to 6 show the relationships on one side of the connecting arrangement. The other half of the connecting arrangement again is symmetrical with respect to the longitudinal center plane of the vehicle. The arrangement of the abutting face ends of the dashboard 12, on the one hand, as well as the center console 13, on the other hand, corresponds essentially to that of the above example; specifically, the dashboard 12 consists of a shaped plastic part 12b and an exterior covering 12a.

Figure 3:
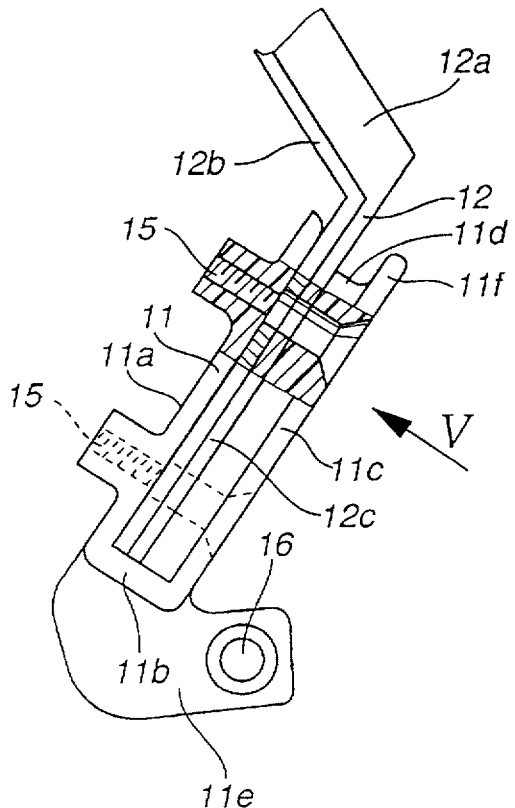
FIG. 3 is a lateral sectional view of the dashboard of an arrangement for connecting the dashboard and the center console according to another preferred embodiment of the present invention.

As illustrated in FIG. 3, the respective connection element 11 is U-shaped in its lateral view, the two U-legs 11a, 11c being connected by way of an elastically bendable center part 11b. A dovetail guide 11d, whose shape can be easily recognized in connection with the view of FIG. 5 and which corresponds essentially to that of the dovetail guides of the above example, is molded to one 11c of the two U-legs. This means that the dovetail guide 11d of the connection element 11 is accessible from above and widens in the downward direction. For the mounting, the respective connection element 11 is slid from below onto a corresponding fastening section 12c of the rearwardly facing side of the dashboard 12 in such a manner that this fastening section is received between the connection element legs 11a, 11c, the leg 11c provided with the dovetail guide 11d pointing toward the outside. Subsequently, the screwed connections 15 are entered for fixing the connection element 11 to the fastening section 12c of the dashboard 12.

Figure 4:
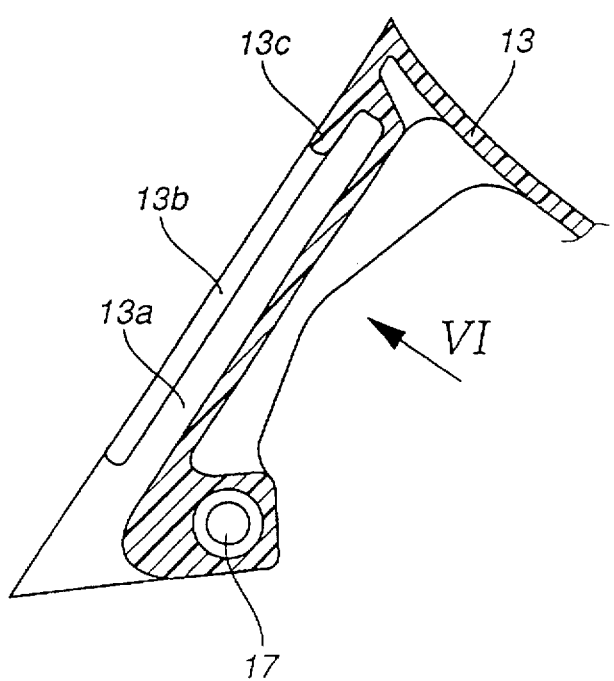
FIG. 4 is a lateral sectional view of the center console which engages with the dashboard of FIG. 3.
Figure 5:
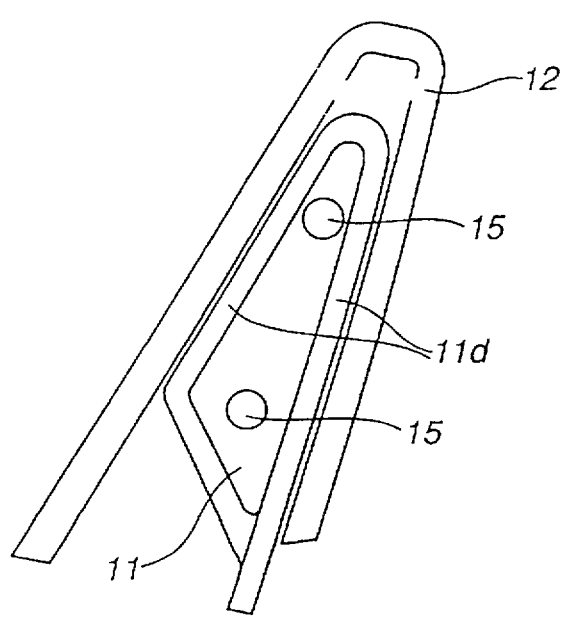
FIG. 5 is a view along arrow V in FIG. 3.
Figure 6:
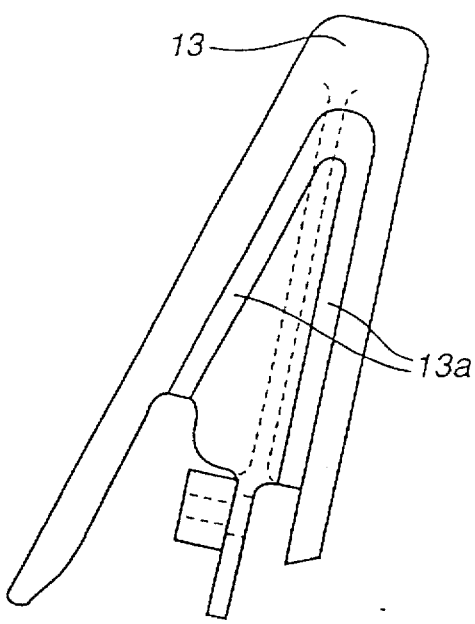
FIG. 6 is a view along arrow VI in FIG. 4.

As illustrated in FIGS. 4 and 6, analogously to the above example, dovetail guides 13a, which are closed in the upward direction, are molded on laterally on the forwardly facing end of the center console 13, which dovetail guides 13a widen in an opening manner in the downward direction. In this case, the lateral dovetail webs 13b corresponding to the respective dovetail guide 13a are connected with one another on the top side by way of a flange 13c which can be reached behind and into which, after the mounting of the connecting arrangement, a corresponding top-side dovetail web arc 11f of the pertaining connection element 11 engages in a position securing manner. In this case, the forward face end of the center console 13 with the two laterally molded-on dovetail guides 13a is fitted from above onto the rearward face side of the dashboard 12 provided with the two dovetail connection elements such that the dovetail guides 11d, 13a interact for implementing the dovetail connections.

For securing the dovetail connections and thus the connection of the dashboard 12 and the center console 13, respective securing screwed connections are provided for the purpose of which an extension 11e is molded to the connection elements 11 in a plane perpendicularly to the plane of the dovetail guides. The extension 11e has a bore 16 which is in alignment with a corresponding bore 17 of the center console 13 after the connecting arrangement has been fitted together. The fixing screwed connection will then be entered through the aligned bores 16, 17. This screwed connection is arranged such that it is easily accessible from above by way of a gear shift block cutout of the center console 13 so that it can be released without any problems for the demounting of the connecting arrangement, after which the center console 13 can be removed from the dashboard 12 in the upward direction.

The illustrated connecting arrangements show that the connecting arrangement according to the present invention represents a low-cost, easily mountable implementation of the connection of a center console with a dashboard which is favorable with respect to visual aspects as well as to force transmission aspects. In addition to the fastening devices, the only separate components are the two connection elements or, as an alternative, the cross-traverse, the latter, on the one hand, providing the dovetail guides and, on the other hand, being used for indicating the measurements and the stiffening for the dashboard and as a directly connecting element between the dashboard and the center console. By means of the geometry of the connecting arrangement according to the invention, all forces to be transmitted can be absorbed in the connection. It is understood that, as required, this connecting arrangement can also be used for the form-locking and force-locking connection of two components other than the center console and the dashboard.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for connecting a dashboard and a center console comprising:

a dashboard;

at least one connection element which is detachably mounted on the dashboard said connection element having connection element dovetail guides arranged to extend longitudinally in a downwardly widening manner along a rearwardly facing side of the dashboard; and a center console having console dovetail guides arranged on a forwardly facing side, said console dovetail guides being configured to engage respective of said connection element dovetail guides in a form-locking manner.

2. An arrangement for connecting a dashboard and a center console according to claim 1, wherein two of said connection elements are detachably mounted on the dashboard proximate opposite respective lateral ends of said rearwardly facing side.

3. An arrangement for connecting a dashboard and a center console according to claim 1, wherein said connection element is formed as a unitary cross-traverse which is detachably mounted on the dashboard, said dovetail guides being molded proximate opposite respective lateral ends of the cross-traverse.

4. An arrangement for connecting a dashboard and a center console according to claim 3, wherein the cross-traverse is fixed on the dashboard by means of fastening screws which are simultaneously used for fastening a center reinforcing part on the dashboard.

5. An arrangement for connecting a dashboard and a center console according to claim 4, further comprising securing screwed connections arranged adjacent to the dovetail connections and which additionally connect the center console with the cross-traverse and the center reinforcing part.

6. An arrangement for connecting a dashboard and a center console according to claim 1, wherein each of said connection element dovetail guides comprises a pair of connection element webs which extend laterally outwardly in cross section, and wherein each of said console dovetail guides comprise a pair of console webs which extend laterally inwardly in cross section, said connection element webs engaging said console webs in a form-locking manner.

* * * * *